(12) United States Patent
Albert (10) Patent No.: US 10,605,353 B2
(45) Date of Patent: Mar. 31, 2020

(54) PINION CAGE FOR SUPPORTING AT LEAST ONE PLANET WHEEL IN A SPIRAL GEAR PLANETARY GEAR TRAIN FOR AN ADJUSTMENT DEVICE FOR ADJUSTING TWO STRUCTURAL COMPONENTS WHICH CAN BE ADJUSTED RELATIVE TO ONE ANOTHER, SPIRAL GEAR PLANETARY GEAR TRAIN WITH SUCH A PINION CAGE AND ENGINE TRANSMISSION UNIT WITH SUCH A SPIRAL GEAR PLANETARY GEAR TRAIN

(71) Applicant: IMS Gear SE & Co. KGaA, Donaueschingen (DE)

(72) Inventor: Simon Albert, Friedenweiler (DE)

(73) Assignee: IMS Gear SE & Co. KGaA, Donaueschingen (DE)

( * ) Notice: Subject to any disclaimer, the term of this patent is extended or adjusted under 35 U.S.C. 154(b) by 0 days.

(21) Appl. No.: 16/152,047

(22) Filed: Oct. 4, 2018

(65) Prior Publication Data
US 2019/0154138 A1 May 23, 2019

(30) Foreign Application Priority Data
Nov. 17, 2017 (EP) .................................... 17202336

(51) Int. Cl.
*F16H 1/34* (2006.01)
*F16H 1/30* (2006.01)
*F16H 57/08* (2006.01)

(52) U.S. Cl.
CPC ............. *F16H 57/082* (2013.01); *F16H 1/30* (2013.01); *F16H 1/34* (2013.01)

(58) Field of Classification Search
CPC .............. F16H 57/082; F16H 1/30; F16H 1/34
See application file for complete search history.

(56) References Cited

U.S. PATENT DOCUMENTS

| 1,276,855 A | 8/1918 | Apple |
| 5,387,162 A | 2/1995 | Yang |

(Continued)

FOREIGN PATENT DOCUMENTS

| EP | 2166252 | 3/2010 |
| EP | 2860338 | 4/2015 |

(Continued)

OTHER PUBLICATIONS

European Patent Office, "European Search Report", issued in European patent application No. EP17202336.8, dated May 30, 2018, document of 8 pages.

(Continued)

*Primary Examiner* — David J Hlavka
(74) *Attorney, Agent, or Firm* — Akerman LLP; Peter A. Chiabotti (57) ABSTRACT

A pinion cage for supporting at least one spiral gear planet wheel in a spiral gear planetary gear train for an adjustment device for adjusting two structural components which can be adjusted relative to one another, wherein the spiral gear planet wheel comprises a planet wheel axle which comprises a first axial section extending over the spiral gear planet wheel and comprises a second axial section extending over the spiral gear planet wheel, and the pinion cage comprises a tubular base body which defines a pinion cage axis, at least one perforation arranged in the base body and penetrating through it, a first support section starting from the perforation, a second support section starting from the perforation, wherein the first and the second support sections are constructed for rotatably receiving the first and the second axial sections and are arranged in such a manner that the planet wheel axle runs in a twisted manner to the pinion cage axis if the axial sections are received in the support sections, and the pinion cage comprises a first fixing means connected to (Continued)

the base body for fixing the first axial section in the base body and a spiral gear planetary gear train with such a pinion cage and to an engine transmission unit with such a spiral gear planetary gear train.

16 Claims, 5 Drawing Sheets

(56) References Cited

U.S. PATENT DOCUMENTS

| | | | |
|---|---|---|---|
| 10,344,532 B2* | 7/2019 | Mazzoni | E06B 9/72 |
| 2011/0243740 A1* | 10/2011 | Siegfriedsen | F16H 1/48 |
| | | | 416/170 R |
| 2015/0105207 A1 | 4/2015 | Hagedorn et al. | |
| 2015/0330467 A1 | 11/2015 | Bourton | |
| 2016/0297469 A1 | 10/2016 | Galehr | |
| 2019/0234489 A1* | 8/2019 | Reed | F16H 1/30 |

FOREIGN PATENT DOCUMENTS

| | | |
|---|---|---|
| JP | 2004-263745 | 9/2004 |
| JP | 2016-188703 | 11/2016 |
| JP | 2016-534263 | 11/2016 |
| WO | 2014/095966 | 6/2014 |
| WO | 2015/036328 | 3/2015 |

OTHER PUBLICATIONS

Korean Patent Office, "Office Action", which was issued to Korean counterpart application No. 10-2018-0142141, document of 21 pages, dated Dec. 10, 2019.

* cited by examiner

PINION CAGE FOR SUPPORTING AT LEAST ONE PLANET WHEEL IN A SPIRAL GEAR PLANETARY GEAR TRAIN FOR AN ADJUSTMENT DEVICE FOR ADJUSTING TWO STRUCTURAL COMPONENTS WHICH CAN BE ADJUSTED RELATIVE TO ONE ANOTHER, SPIRAL GEAR PLANETARY GEAR TRAIN WITH SUCH A PINION CAGE AND ENGINE TRANSMISSION UNIT WITH SUCH A SPIRAL GEAR PLANETARY GEAR TRAIN

CROSS-REFERENCE TO RELATED APPLICATIONS

This application claims priority to European Patent Application No. 17202336.8, filed Nov. 17, 2017, which is incorporated by reference in its entirety.

BACKGROUND

The present application relates to a pinion cage for supporting at least one planet wheel in a spiral gear planetary gear train for an adjustment device for adjusting two structural components which can be adjusted relative to one another. The application furthermore relates to a spiral gear planetary gear train which comprises such a pinion cage. Furthermore, the application relates to an engine transmission arrangement with such a spiral gear planetary gear train.

SUMMARY

Planetary gear trains are used in many drive trains since they make possible large gear ratios or reducing gear ratios in a small space. An area of application is auxiliary drives for motor vehicles with which two vehicle parts which can be adjusted relative to one another can be moved relative to one another. An example for such auxiliary drives are electro-mechanical actuator arrangements which are used, among other things, for actuating parking brakes of motor vehicles. Other auxiliary drives are used, for example, for adjustments of seat length, trunk lid adjustments, window raisers and sliding roof adjustments. Since the space available in motor vehicles is scarce, planetary gear trains can use their advantages especially well here.

Another area of application is, for example, drives for windows and roller blinds of buildings which are playing an increasingly more important part given the increasing digitizing of buildings, designated as "smart homes".

In auxiliary drives, electromotors are used almost without exception as the drive source. The typically used electromotors frequently rotate with a comparatively high speed so that high reductions of speed are necessary order to be able to adjust the structural components relative to each other with the desired, relatively slow movement. In addition, the torques outputted by the electromotor are frequently insufficient for being able to move the structural components, so that reductions of speed are necessary even for this reason.

Even if known planetary gear trains can make high gear ratios or reducing gear ratios available, they are not sufficient in some areas of application, so that it is necessary to use two-stage or multi-stage transmissions in which two or more planetary gear trains are arranged in the drive train. This increases the complexity of the drive train as a result of which the manufacture is made more complex in comparison to a one-stage planetary gear train, which increases the probability of downtime and enlarges the structural space.

A possibility for increasing the high or reducing gear ratios of planetary gear trains resides in the using of so-called "coaxial transmissions". The gears of customary planetary gear trains are constructed as spur gears. In coaxial transmissions the sun wheel is constructed as a worm gear and the planet wheels are constructed with a correspondingly adapted planet wheel toothing. The hollow wheel comprises an inner toothing corresponding to the planet wheel toothing. An especially noticeable feature of such coaxial transmissions is the fact that the planet wheel axes are not parallel to the axis of rotation of the worm gear but rather run in a twisted manner to it. At least in this regard the concept "coaxial transmission" is not appropriate, so that such transmissions will be designated in the following as worm gear planetary gear trains. Such worm gear planetary gear trains are disclosed, for example, in WO 2015/036328 A1 and in EP 2 166 252 A1. In addition to the high or reducing gear ratios, such worm gear planetary gear trains make available a calm running behavior with a low development of noise.

For the rotatable supporting of the planet wheels, the pinion cages can comprise planet wheel axles connected to the pinion cages, as is known, for example, from WO 2014/095966 A1. Also, the planet wheel axles can be constructed in one part with the pinion cage, as is described, for example, in EP 2 860 338 A2.

Such concepts for supporting the planet wheels are not suitable if the planet wheel axes are supposed to run twisted relative to the pinion cage axle. In particular, the making available of an exactly aligned planet wheel axle is difficult and expensive.

An embodiment of the present disclosure therefore has the problem of indicating a pinion cage which is simple to manufacture and in the case of which the planet wheel axles can be exactly aligned and mounted. In addition, an embodiment of the present disclosure is based on the problem of creating a planetary gear train which is simple to manufacture and in the case of which the planet wheel axles can be exactly aligned and mounted. In addition, an embodiment of the disclosure is based on the problem of creating an engine-transmission arrangement comprising such a planetary gear train.

This problem is solved with the features and structures recited herein. Advantageous embodiments of the present disclosure are also recited herein.

An embodiment of the disclosure relates to a pinion cage for supporting at least one spiral gear planet wheel in a spiral gear planetary gear train for an adjustment device for adjusting two structural components which can be adjusted relative to one another, wherein the spiral gear planet wheel comprises a planet wheel axle which comprises a first axial section extending over the spiral gear planet wheel and comprises a second axial section extending over the spiral gear planet wheel. The pinion cage comprises, as suggested, a tubular base body which defines a pinion cage axle, comprises at least one perforation arranged in the base body and penetrating through it, a first support section starting from the perforation, and a second support section starting from the perforation. The first and the second support sections are constructed for rotatably receiving the first and the second axial section and are arranged in such a manner that the planet wheel axle runs in a twisted manner to the pinion cage axle if the axial sections are received in the support sections. Furthermore, the pinion cage comprises a first fixing means connected to the base body for fixing the first axial section in the base body.

The present disclosure relates primarily to spiral gear planetary gear trains but can be used without any limitation in worm gear planetary gear trains such as they are disclosed in WO 2015/036328 A1 and in EP 2 166 252 A1. Worm gear planetary gear trains and spiral gear planetary gear trains have great similarities but differ mainly in the following point: Whereas in the case of spiral gear planetary gear trains there is a punctiform contact with the spiral gear planetary gear train which becomes a so-called pressure ellipse when loaded, in the case of a worm gear planetary gear train there is a linear contact on account of the globoid shape of the toothing section of the worm gear and the planet wheels.

The tubular base body of the pinion cage encloses an inner space in which in the mounted state of the planetary gear train the sun wheel, in the case of spiral gear planetary gear trains the spiral gear is arranged. The perforation penetrating through the base body makes possible the engagement of the planet wheels with the spiral gear. Consequently, the planet wheels are supported in the pinion cage in such a manner that they extend through the perforation and partially into the inner space.

The support sections are constructed in such a manner that they bring about at least a partial radial support of the planet wheel in the base body. Depending on the embodiment, the fixing means can make available another radial and/or axial support of the planet wheel. The first fixing means is not formed on the base body but rather is a separate structural component which is connected during the mounting of the pinion cage to the base body. As a result, the support sections can be designed in such a manner that they are readily accessible during the mounting, so that the planet wheel axis can be introduced without great expense into the support sections. Subsequently, the first fixing means is connected to the base body in order to complete the support of the planet wheel axle.

The structural components which can be adjusted relative to each other with the adjustment device can be vehicle parts such as vehicle seats, trunk lids, vehicle windows or sliding roofs. However, the structural components can also be windows, shutters or roller blinds of buildings or ships. The acoustical qualities of the adjustment device provided with the suggested pinion cages clearly differ from known adjustment devices so that a lesser development of noise can be achieved.

According to another embodiment the pinion page comprises a second fixing means with the base body for fixing the second axial section in the base body. It can be sufficient to fix only the first axial section with the first fixing means in or on the base body. However, depending on the use, it can be possible to also fix the second axial section with another, namely, the second fixing means, in or on the base body, for example, in order to transmit higher torques. The first and the second fixing means can be designed with the same structure so that the extra expense for fixing the second axial section is kept low.

In another embodiment which is developed further, the base body can comprise an outer surface and the first support section and/or the second support section can be constructed as a groove-shaped recess starting from the outer surface. As a result of the fact that the first and/or the second support section start from the outer surface, they are radially open to the outside and are therefore readily accessible so that the mounting of the pinion cage is simplified.

A further-developed embodiment is characterized in that the groove-shaped recess comprises at least one boundary surface for defining the axial mobility of the planet wheel. As initially mentioned, the planet wheel axes in spiral gear planetary gear trains run twisted relative to the pinion cage axle. As a result, in contrast to traditional planetary gear trains with straight toothing, forces also act during operation along the planet wheel axles, as a result of which the planet wheels travel along the planet wheel axles, so that an axial support is necessary. As a result of the fact that the groove-shaped recess has a boundary surface with which the axial mobility of the planet wheel is defined along the planet wheel axle, no further measures are necessary for the axial support of the planet wheel, which keeps the mounting and the construction of the suggested pinion cage simple.

In a further-developed embodiment the first fixing means and/or the second fixing means can comprise at least one projection which covers the groove-shaped recess at least partially. As mentioned, the groove-shaped recesses are radially open to the outside. As a result, it can happen that the planet wheels can fall out of the pinion cage in particular during the assembly and before they are brought into engagement with an inner toothing of an inner spiral gear of the spiral gear planetary gear train. As a result of the fact that the first fixing means and/or the second fixing means cover the groove-shaped recess at least partially with their projection, they bring about a limitation of the radial mobility of the planet wheel axles in a radially outward manner so that a falling out of the planet wheels is prevented.

According to a further-developed embodiment, the projection forms a limiting surface for defining the axial mobility of the planet wheel. In this embodiment the projection extends almost up to the planet wheel so that a small slot remains between the projection and the planet wheel. For the case that the planet wheel should move axially toward the projection, after a certain point it makes contact with the projection so that the axial mobility is limited by the projection. In order to obtain a contact between the planet wheel and the projection which is as uniform as possible, the projection forms a limiting surface. In addition to or as an alternative to the boundary surface which is formed by the support sections, another defining of the axial mobility of the planet wheel and consequently an axial support is make available. For the case that the pinion cage comprises the boundary surfaces as well as the limiting surfaces, an axial support which protects material especially well is made available.

In another embodiment the first support section and/or the second support section can be formed by a bore starting from the first front surface. In the case of a bore, the planet wheel axle is completely surrounded over its circumference by the material of the base body so that the base body makes available an optimal surface pressure and a maximum radial carrying component and therefore the planet wheel is especially well supported radially. If the bore is constructed as a blind hole bore, the bottom of the blind hole bore brings about the boundary of the axial mobility of the planet wheel is an axial direction. The first fixing means serves in this case to define the axial mobility into the opposite axial mobility. A second fixing means is not necessary in this case. In another embodiment the front surface has a retracted section from which the bore starts, wherein the first fixing means comprises a projection which engages into the retracted section. The retracted section acts as a receptacle into which the projection engages like a claw. As regards the rotation, a positive lock is produced so that the first fixing means can be supported on the base body in a rotation-proof manner. The connection of the first fixing means is therefore only axially loaded and not by torsion, as a result of which it can be dimensioned to be smaller and can be manufactured more advantageously.

A further-developed embodiment is characterized in that the first axial section forms a contact surface and the first fixing means forms a counter-surface contact which run corresponding to one another at least in sections. This embodiment relates to the case that the first fixing means serves for the defining of the axial mobility of the planet wheel. The first axial section makes contact with the first fixing means during a corresponding traveling of the planet wheel along the planet wheel axle. A wear surface is produced here due to the rotation of the planet wheel axis. In order to reduce the wear as far as possible, a large-surface contact is achieved in that the contact surface of the first axial section and the counter-surface contact of the first fixing means run corresponding to one another at least in sections. The term a corresponding course means that, for example, if the contact surface is level, the counter-contact surface is also level and parallel to the contact surface. If the contact surface has a curvature, the counter-contact surface has a corresponding curvature. The contact surface is enlarged by this and wear-promoting punctiform or linear contacts are avoided.

According to a further-developed embodiment the base body and the first fixing means have an engagement contour for the positive connection of the first fixing means to the base body. This makes it possible to connect the first fixing means by pressing it onto the base body, which is, for example, a simple manner to fasten the fixing means to the base body in comparison to welding. The engagement contour comprises undercuts, for example, on the base body, which are engaged behind after the pressing on of elastic sections of the first fixing means.

In another embodiment the planet wheel can comprise a planet wheel toothing with a bulging. In particular in coaxial transmissions the bulging makes an especially uniform engagement with the sun wheel available, as a result of which a good smooth running and a low development of noise can be realized.

A further-developed embodiment is characterized in that the planet wheel comprises a planet wheel toothing with a profile covering. The profile covering also contributes to a good smooth running and a low development of noise.

According to another embodiment the pinion cage consists of plastic or comprises plastic. With plastic, the pinion cage can be manufactured especially easily, in particular compared to a pinion cage consisting of metal, which results in a savings of weight, for example, in the vehicle.

Another embodiment is characterized in that the pinion cage is injection-molded. The suggested pinion cage can be economically produced in large numbers in the injection-molding method. They can be especially well removed radially from the mold if the support sections are open radially to the outside, for which reason the suggested pinion cage is especially suitable for being manufactured with the injection-molding method.

An embodiment of the present disclosure relates to a spiral gear-planetary gear train, in particular for an adjustment device for adjusting two structural components which can be adjusted relative to one another, comprising a pinion cage according to one of the previous embodiments which defines a pinion cage axle, at least one spiral gear planet wheel which is supported in the pinion cage in such a manner that it can rotate about a planet wheel axle and comprises a planet wheel toothing, wherein the planet wheel axle runs twisted relative to the pinion cage axle, a spiral gear shaft which is mounted in such a manner that it can rotate about the pinion cage axle, and comprises a spiral gear toothing which is engaged with the planet wheel toothing, and comprises an inner spiral gear with an inner toothing which engages with the planet wheel toothing.

Furthermore, an embodiment of the present disclosure relates to an engine transmission arrangement in particular for an adjustment device for adjusting two structural components which can be adjusted relative to one another, comprising an electromotor and a spiral gear planetary gear train according to the previously described embodiment, wherein the electromotor comprises a motor shaft which is connected in a rotation-proof manner to the spiral gear shaft.

The technical effects and advantages which can be achieved with the suggested spiral gear planetary gear train and suggested engine transmission arrangement correspond to those discussed for the present pinion cage. It is pointed out in sum that especially the mounting of the planetary gear train and of the engine transmission arrangement can be simplified due to the suggested shaping of the pinion cage. In particular, spiral gear planetary gear trains in which the planet wheel axle runs in a twisted manner relative to the spiral gear axle can be manufactured in a simple manner.

Another embodiment is characterized in that the inner spiral gear is connected in a rotation-proof manner to the electromotor. In general, it is simpler to fasten the inner spiral gear to the electromotor in a rotation-proof manner than to connect the inner spiral gear which is axially fixed but rotatable to the electromotor. In addition, the engine transmission arrangement comprises no rotatable parts on the outside since the inner spiral gear surrounds the rotating pinion cage, as a result of which the safety during the operation of the engine transmission arrangement can be increased.

In addition, the present disclosure relates to the using of a suggested pinion cage in adjustment devices in vehicles for adjusting two vehicle parts which can be adjusted relative to one another.

BRIEF DESCRIPTION OF THE DRAWINGS

Exemplary embodiments of the present application are explained in detail in the following with reference made to the attached drawings. In the drawings.

DETAILED DESCRIPTION

Figure 1A:
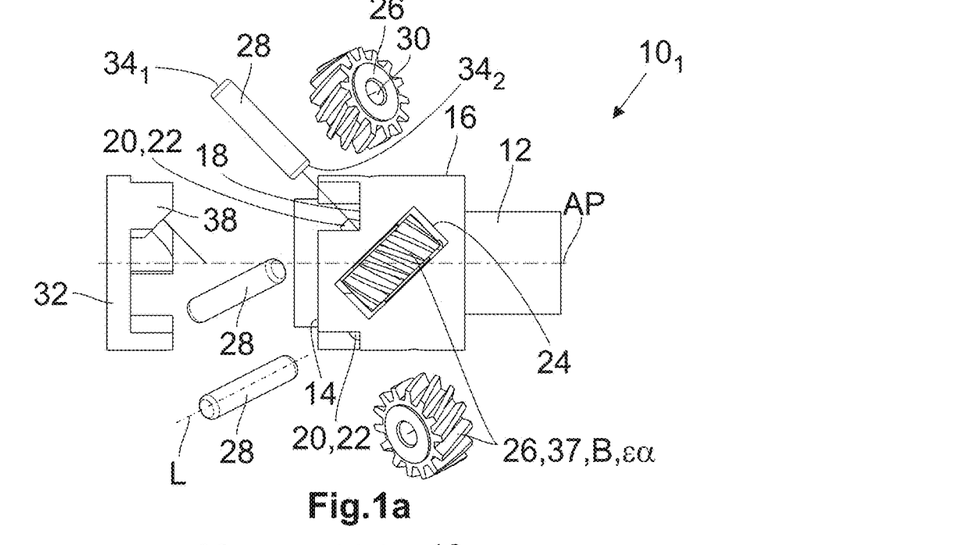
FIGS. 1a-1c show a first exemplary embodiment of a pinion cage according to the present disclosure in different mounting states.
Figure 1B:
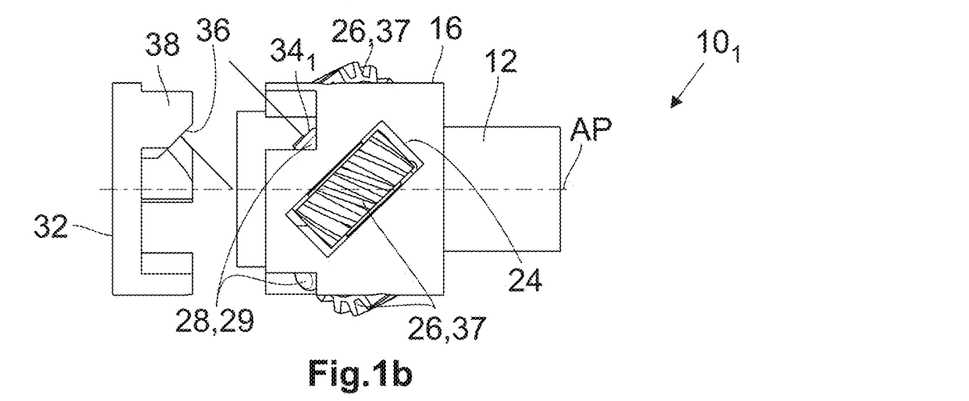
Figure 1C:
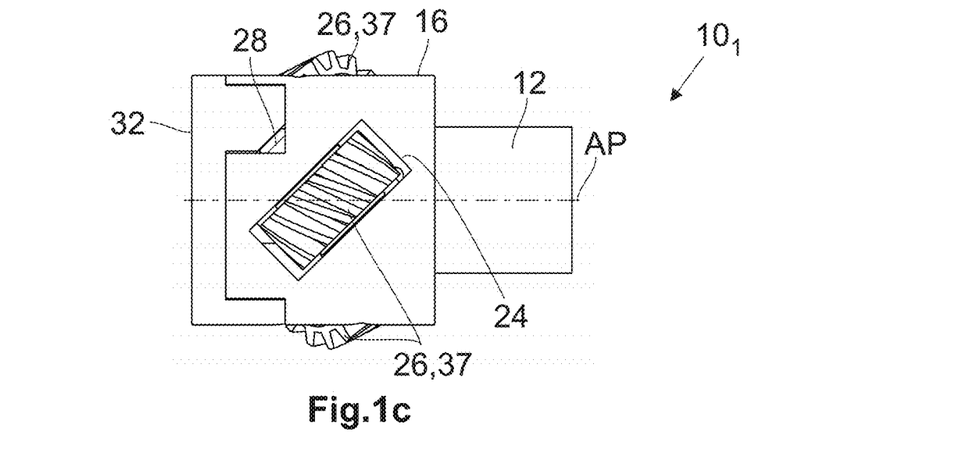

FIGS. 1a to 1c show a first exemplary embodiment of a pinion cage $10_1$ in different mounting states with each from a top view. FIG. 1a shows a largely dismounted state, FIG. 1b shows the pinion cage $10_1$ partially mounted and FIG. 1c shows the pinion cage $10_1$ completely mounted.

Figure 3A:
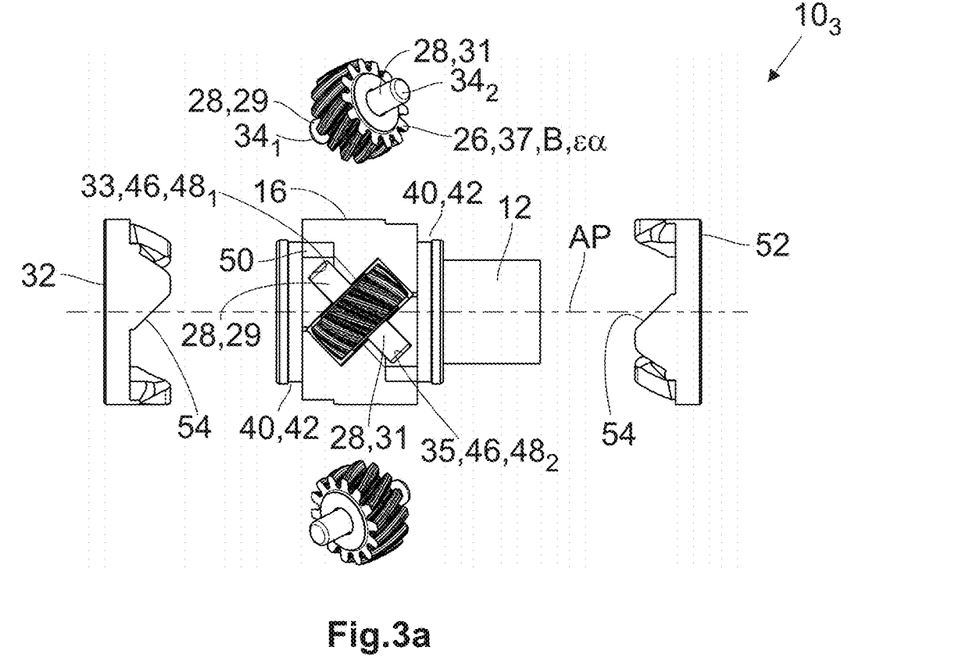
FIGS. 3a-3c show a third exemplary embodiment of a pinion cage according to the present disclosure in different mounting states.

The pinion cage $10_1$ comprises a tubular base body 12 which surrounds an inner space 13 and forms a front surface 14 and an outer surface 16. The base body 12 defines a pinion cage axis AP. The front surface 14 forms a total of three sections 18 which are set back and from each of which a bore 20 which are designed in the first exemplary embodiment as blind hole bores 22 extend into the base body 12. The blind hole bores 22 run twisted relative to the pinion cage axis AP. Furthermore, the pinion cage 10$_1$ comprises a total of three perforations 24 which are arranged in the base body 12 and which penetrate through the base body 12 starting from the outer surface 16. The bores 20 are designed in such a manner that they each form a first support section 33 starting from perforation 24 and a second support section 35 starting from perforation 24 (cf. FIGS. 3*a* and 4*a*). The two support sections 33, 35 serve to support a spiral gear planet wheel 26. The spiral gear planet wheel 26 has a planet wheel axle 28 with a longitudinal axis L, wherein the planet wheel axle 28 comprises a first axial section 29 projecting over the spiral gear planet wheel 26 and a second axial section 31 projecting over the spiral gear planet wheel 26 (FIG. 3*a*). The planet wheel axle 28 can be run through a through bore 30 of the spiral gear planet wheel 26. Moreover, the spiral gear planet wheel 26 comprises a planet wheel toothing 37 with a bulging B and a profile covering εα.

The first axial section 29 can be rotatably received in the first support section 33 and the second axial section 31 can be rotatably received in the second support section 35.

In addition, the pinion cage 10$_1$ comprises a first fixing means 32 which can be fastened on the base body 12. The first axial section 29 forms a first contact surface 34$_1$ and the second axial section 31 forms a second contact surface 34$_2$ which runs vertically to the longitudinal axis L of the planet wheel axle 28. The first fixing means 32 forms a counter-contact surface 36 which runs corresponding to the contact surface 34$_1$ in the mounted state. The counter-contact surface 36 is arranged on the projection 38 of the first fixing means 32.

The pinion cage 10$_1$ is mounted in the following manner: At first the spiral gear planet gears 26 are introduced into the perforations 24 and aligned in such a manner that the through bores 30 are aligned with the blind hole bores 22 (see FIG. 1*a*). Then, the planet wheel axles 28 are introduced into the blind hole bores 22 until the second contact surface 34$_2$ makes contact with the bottom of the blind hole bores 22. During the introduction the planet wheel axles 28 are run through the through bores 30 of the spiral gear planet wheels 26. This state is shown in FIG. 1*b*. The first fixing means 32 is now connected to the pinion cage 10$_1$, during which the projections 38 of the first fixing means 32 are introduced into the set-back sections 18 of the front surface 14 of the pinion cage 10$_1$ as a result of which the first fixing means 32 is positioned in a rotation-proof manner opposite the base body 12. The first fixing means 32 is adhered or welded to the base body 12 or in some other suitable manner to the base body 12. The support sections 33, 35 are constructed so that the planet wheel axles 28 of the spiral gear planet wheels 26 run in a twisted manner relative to the spiral gear axis AP. After the first fixing means 32 has been fastened to the base body 12, the mounting of the pinion cage 10$_1$ is finished.

As is in particular evident from the FIGS. 1*b* and 1*c*, the first contact surface 34$_1$ and the counter-contact surface 36 run parallel to one another when the first fixing means 32 is fastened to the base body 12. As a result, the spiral gear planet wheel 26 is axially supported. In the mounted state the first axial section 29 can make contact with the first contact surface 34$_1$ on the counter-contact surface 36 of the first fixing means 32, while the second contact surface 34$_2$ can rest on the bottom of the blind hole bore 22. In order to prevent a clamping of the spiral gear planet wheel 26, for example, as a consequence of an expansion caused by an elevation of temperature, a certain play is provided. Accordingly, a slight mobility of the planet wheels is possible along the longitudinal axis L of the planet wheel axes 28.

Figure 2A:
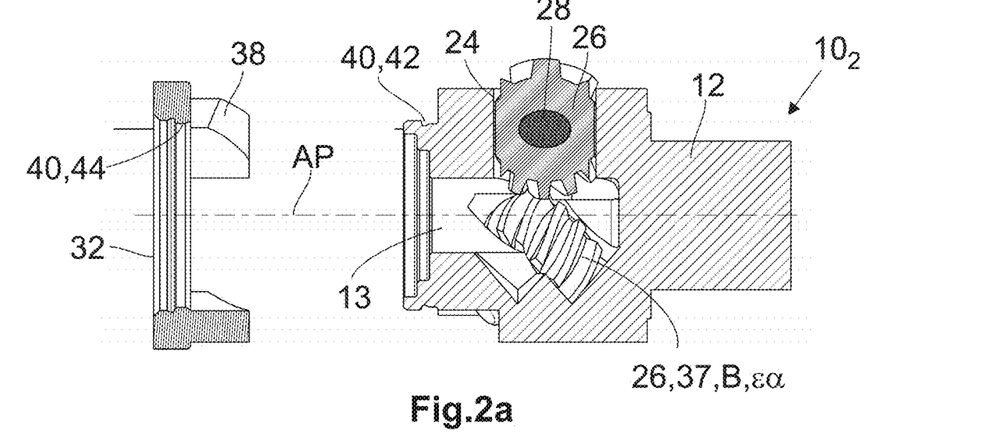
FIGS. 2a-2c show a second exemplary embodiment of a pinion cage according to the present disclosure in different mounting states.
Figure 2B:
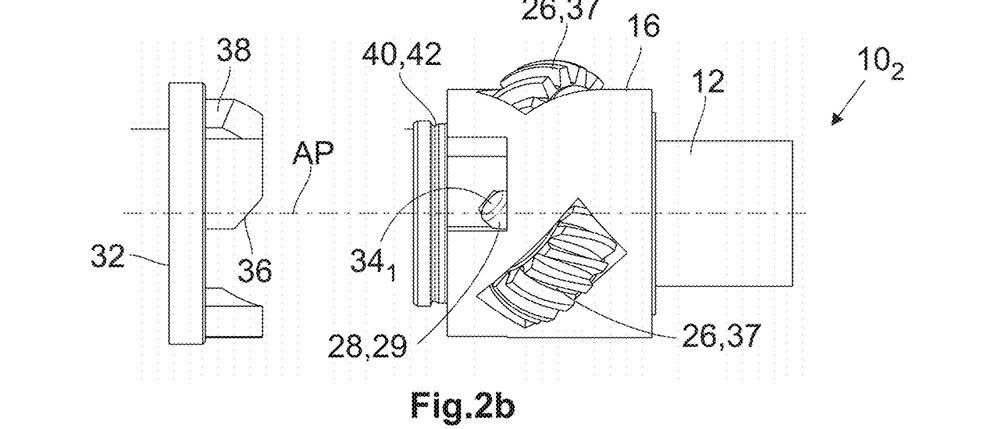
Figure 2C:
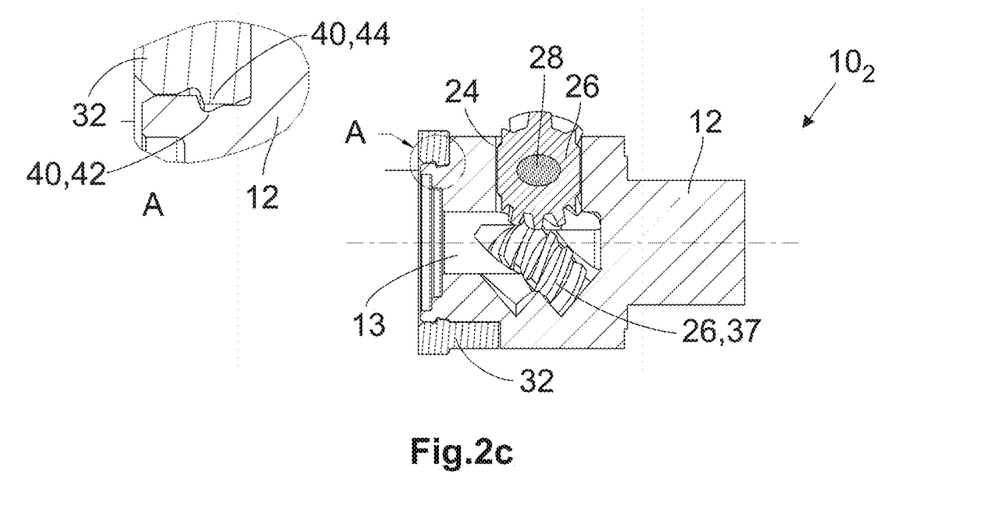

FIGS. 2*a* to 2*c* show a second exemplary embodiment of the pinion cage 10$_2$ in different mounting states. The pinion cage 10$_2$ according to the second exemplary embodiment is largely similar to the one according to the first exemplary embodiment, wherein the base body 12 and the first fixing means 32 comprises a first engagement contour 40. The first engagement contour 40 comprise an undercut 42 which is arranged on the base body 12, aligned along the pinion cage axis AP and into which a flexible nose 44 of the first fixing means 32 and belonging to the first engagement contour 40 engages during the introduction of the projection 38 of the first fixing means 32 into the set-back section 18 of the front surface 14. As is apparent in particular from the enlarged section A of FIG. 2*c*, the first fixing means 32 is positively fastened to the base body 12. In the second exemplary embodiment of the pinion cage 10$_2$ the first fixing means 32 does not have to be adhered or welded to the base body 12 but rather it is sufficient to press the first fixing means 32 with the base body 12, as result of which the connection between the base body 12 and the first fixing means 32 can be made available in a distinctly simpler manner.

Figure 3B:
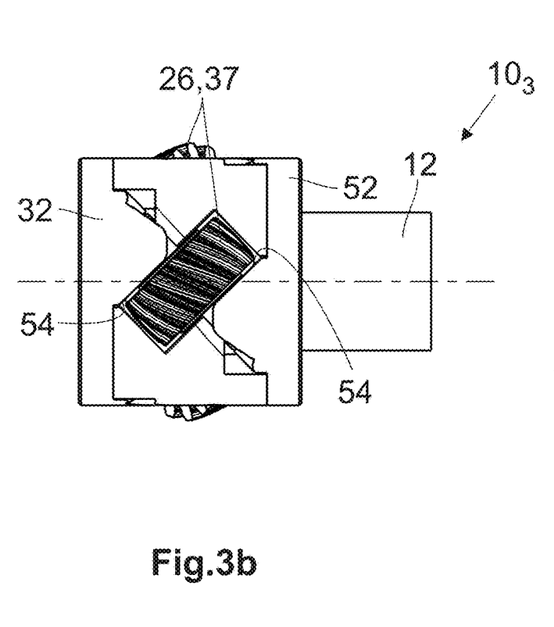
Figure 3C:
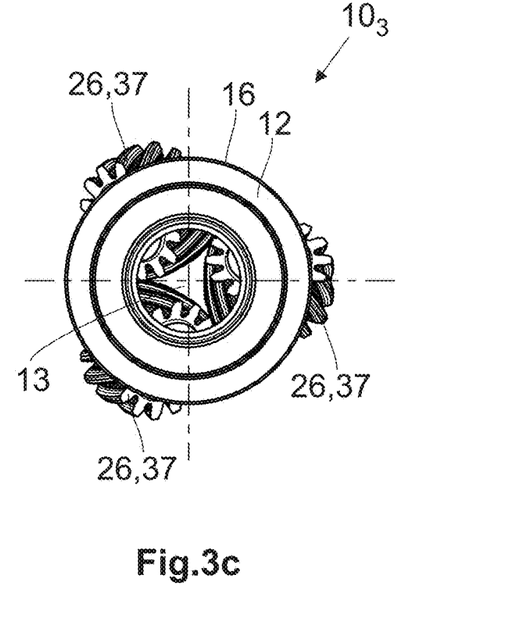
Figure 4A:
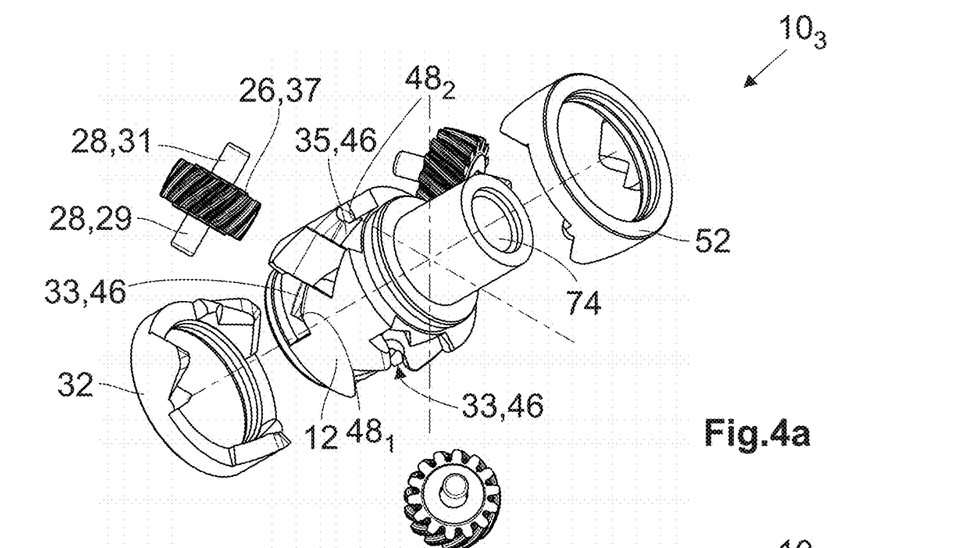
FIGS. 4a-4c show the third exemplary embodiment of a pinion cage according to the present disclosure in different mounting states.
Figure 4B:
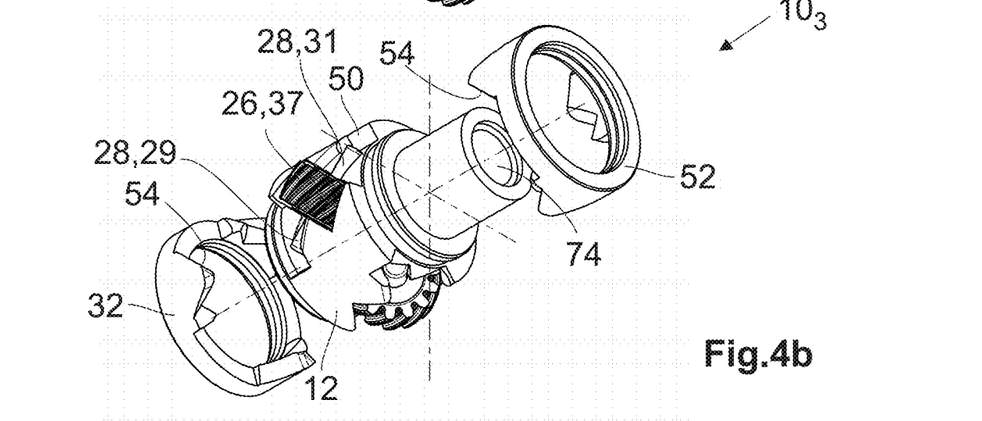
Figure 4C:
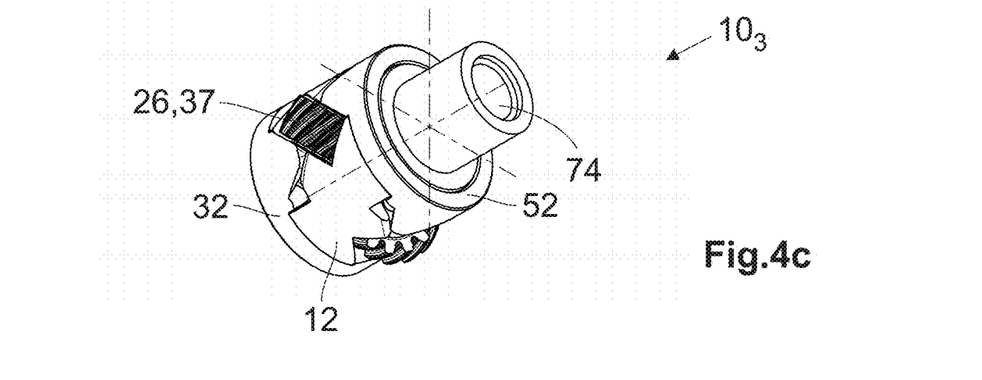

FIGS. 3*a* to 3*c* show a third exemplary embodiment of the pinion cage 10$_3$, wherein in FIG. 3*a* the pinion cage 10$_3$ is only partially mounted, whereas the pinion cage 10$_3$ in the FIGS. 3*b* and 3*c* is mounted in the finished state. FIGS. 3*a* and 3*b* show a top view, whereas FIG. 3*c* shows a front view. FIGS. 4*a* to 4*c* also show the pinion cage 10$_3$ according to the third exemplary embodiment using perspective views in different mounting states.

The basic construction of the pinion cage 10$_3$ according to the third exemplary embodiment corresponds to the first and the second exemplary embodiments so that the following description is limited substantially to the differences of the third exemplary embodiment from the other exemplary embodiments. The first support section 33 and the second support section 35 are formed by groove-shaped recesses 46 which emanate from the outer surface 16, as is apparent especially from the FIGS. 4*a* and 4*b*. The recesses 46 run in a twisted manner relative to the pinion cage axis AP. The recesses 46 comprise a first boundary surface 48$_1$ and a second boundary surface 48$_2$. The boundary surfaces 48 are especially apparent from the FIG. 4*a*.

In addition, the base body 12 comprises a number of recesses 50 which emanate from the outer surface 16. Furthermore, the pinion cage 10$_3$ comprises, adjacent to the first fixing means 32, a second fixing means 52 which is designed with the same construction as the first fixing means 32. In particular, the second fixing means 52 also has a catch contour 40 and forms the nose 44, which can be brought into a second undercut 42 of the base body 12.

In order to mount the pinion cage 10$_1$, at first the planet wheel axle 28 is guided through the through bore 30 of the spiral gear planet wheel 26. Alternatively, the planet wheel axle 28 can be an integral component of the spiral gear planet wheel 26, so that the spiral gear planet wheel 26 is constructed in one part. Since in this exemplary embodiment the storage sections 33, 35 are radially open to the outside, the spiral gear planet wheel 26 can be introduced together with the planet wheel axle 28 into the perforation 24 and into the support sections 33, 35, so that the first axial section 29 makes contact in the first support section 33 and the second axial section 31 makes contact in the second support section 33. The boundary surfaces 48₁, 48₂ can make contact here with the contact surfaces 34, as result of which the axial mobility of the spiral gear planet wheels 26 in the pinion cage 10₃ is limited.

Subsequently, the first fixing means 32 and the second fixing means 52 are connected to the base body 12, wherein the projections 38 of the fixing means 32, 52 engage in the recesses 50 of the base body 12, as a result of which the fixing means 32, 52 are positioned in a rotation-proof manner opposite the base body 12. The axial fastening of the fixing means 32, 52 takes place via the engagement contours 40. As is especially apparent from the FIGS. 3b and 4c, the projections 38 form limiting surfaces 54 which extend almost up to the spiral gear planet wheel 26 and on which the spiral gear planet wheel 26 can rest. The limiting surfaces 54 also serve to limit the axial mobility of the spiral gear planet wheels 26 in the pinion cage 10₃. After the first fixing means 32 and the second fixing means 52 have been fastened to the base body 12, the pinion cage 10₃ is completely mounted.

Figure 5:
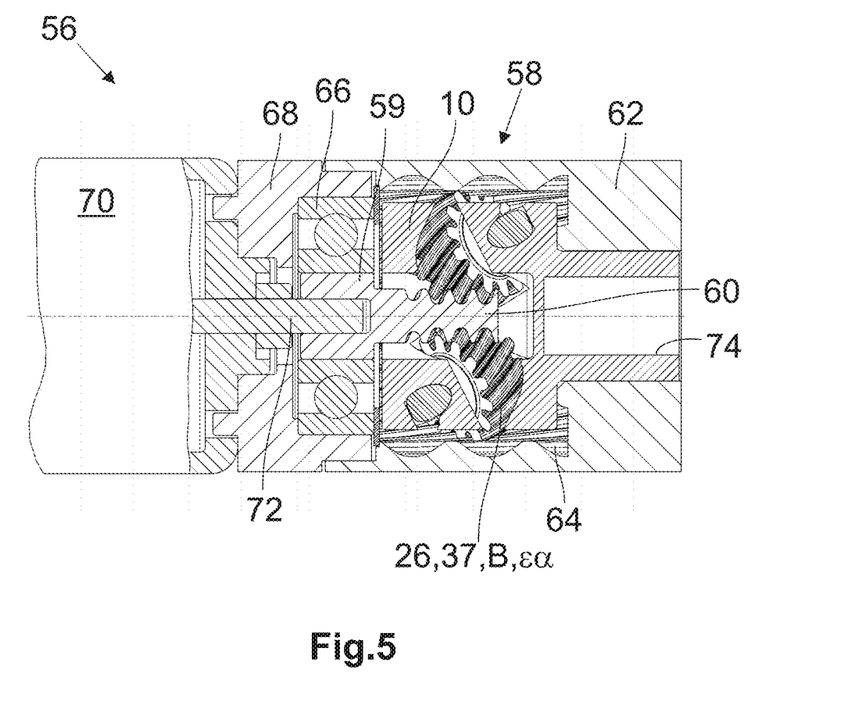
FIG. 5 shows a view in partial section of an engine transmission arrangement with one of the pinion cages shown in the FIGS. 1 to 4.

FIG. 5 shows an engine transmission arrangement 56 using a view in partial section which comprises a spiral gear planetary gear train 58 with one of the pinion cages 10 shown in the FIGS. 1 to 4. In addition, the spiral gear planetary gear train 58 comprises a spiral gear shaft 59 which comprises a spiral gear toothing 60 which is engaged with the planet wheel toothing 37. Furthermore, the spiral gear planetary gear train 58 comprises an inner spiral gear 62 with an inner toothing 64 which engages in the planet wheel toothing 37. The spiral gear shaft 59 is supported axially and radially by a ball bearing 66, wherein the ball bearing 66 is arranged in a bearing receptacle 68.

Furthermore, the engine transmission arrangement 56 comprises an electromotor 70 with a motor shaft 72 which projects out of the electromotor 70. The motor shaft 72 engages in a rotation-proof manner into the spiral gear shaft 59. The bearing receptacle 68 is fastened in a rotation-proof manner to the electromotor 70. In addition, the inner spiral gear 62 is connected in a rotation-proof manner to the bearing receptacle 68. As a result of the fact that the inner spiral gear 62 is fastened in a rotation-proof manner to the bearing receptacle 68 and indirectly in a rotation-proof manner to the electromotor 70, the rotation of the motor shaft 72 is converted into a rotation of the pinion cage 10. The pinion cage 10 comprises a cam 74 with which a drive shaft which is not shown can be connected in a rotation-proof manner.

LIST OF REFERENCE NUMERALS 10, 10₁-10₃ pinion cage
12 base body
14 front surface
16 outer surface
18 set-back section
20 bore
22 blind hole bore
24 perforation
26 spiral gear planet wheel
28 planet wheel axle
29 first axial section
30 through bore
31 second axial section
32 first fixing means
33 first support section
34, 34₁. 34₂ contact surface
35 second support section
36 counter-support surface
37 planet wheel toothing
38 projection
40 catch contour
42 undercut
44 nose
46 recess
48, 48₁, 48₂ boundary surface
50 recess
52 second fixing means
54 limiting surface
56 engine transmission arrangement
58 spiral gear planetary gear train
59 spiral gear shaft
60 spiral gear toothing
62 inner spiral gear
64 inner toothing
66 ball bearing
68 bearing receptacle
70 electromotor
72 motor shaft
74 cam
AP pinion cage axis
B bulging
L longitudinal axis
εα profile covering

What is claimed:

1. A pinion cage for supporting at least one spiral gear planet wheel in a spiral gear planetary gear train for an adjustment device for adjusting two structural components which can be adjusted relative to one another, the spiral gear planet wheel, with a planet wheel axle, the planet wheel axel having a first axial section extending over the spiral gear planet wheel and a second axial section extending over the spiral gear planet wheel, the pinion cage comprising:
    a tubular base body which defines a pinion cage axis,
    a perforation arranged in the tubular base body and penetrating through the tubular base body,
    a first support section starting from the perforation,
    a second support section starting from the perforation,
    wherein the first and the second support sections are constructed for rotatably receiving the first and the second axial sections and are arranged in such a manner that the planet wheel axle runs in a twisted manner to the pinion cage axis if the axial sections are received in the support sections, and
    a first projection connected to the base body for fixing the first axial section in the base body.

2. The pinion cage according to claim 1, further comprising a second projection connected to the base body that fixes the second axial section in the base body.

3. The pinion cage according to claim 1, wherein the base body comprises an outer surface and the first support section and/or the second support section are constructed as a groove-shaped recess starting from the outer surface.

4. The pinion cage according to claim 3, wherein the groove-shaped recess comprises a boundary surface for defining the axial mobility of the planet wheel.

5. The pinion cage according to claim 3, wherein the first projection and/or the second projection at least partially cover the groove-shaped recess.

6. The pinion cage according to claim 5, wherein the first projection, the second projection, or both, form a limiting surface for defining the axial mobility of the planet wheel.

7. The pinion cage according to one of claim 5, wherein the base body comprises a recess in which the projection at least partially engages.

8. The pinion cage according to claim 1, wherein the base body comprises a front surface and a first support section.

9. The pinion cage according to claim 1, wherein the base body comprises a front surface and the second support surface is formed by a bore starting from the first front surface.

10. The pinion cage according to claim 9, wherein the front surface has a retracted section from which the bore starts, and the first projection engages into the retracted section.

11. The pinion cage according to one of claim 8, wherein the first axial section forms a contact surface and the first projection forms a counter-surface contact which run corresponding to one another at least in sections.

12. The pinion cage according to claim 1, wherein the base body and the first projection have an engagement contour for the positive connection of the first projection to the base body.

13. The pinion cage according to claim 1, wherein the pinion cage comprises plastic and is injection-molded.

14. A spiral gear-planetary gear train for an adjustment device for adjusting two structural components which can be adjusted relative to one another, comprising:
   a pinion cage comprising:
      a tubular base body which defines a pinion cage axis,
      a perforation arranged in the tubular base body and penetrating through the tubular base body,
      a first support section starting from the perforation,
      a second support section starting from the perforation,
      wherein the first and the second support sections are constructed for rotatably receiving the first and the second axial sections and are arranged in such a manner that the planet wheel axle runs in a twisted manner to the pinion cage axis if the axial sections are received in the support sections, and
      a first projection connected to the base body for fixing the first axial section in the base body,
   a spiral gear planet wheel which is supported in the pinion cage in such a manner that it can rotate about a planet wheel axle and comprises a planet wheel toothing, wherein the planet wheel axle runs twisted relative to the pinion cage axis,
   a spiral gear shaft which is supported in such a manner that it can rotate about the pinion cage axis, and comprises a spiral gear toothing which is engaged with the planet wheel toothing, and
   an inner spiral gear with an inner toothing which engages with the planet wheel toothing.

15. An engine transmission arrangement, in particular for an adjustment device for adjusting two structural components which can be adjusted relative to one another, comprising:
   an electromotor, and
   a spiral gear planetary gear train comprising:
      a pinion cage comprising:
      a tubular base body which defines a pinion cage axis,
      a perforation arranged in the tubular base body and penetrating through the tubular base body,
      a first support section starting from the perforation,
      a second support section starting from the perforation,
      wherein the first and the second support sections are constructed for rotatably receiving the first and the second axial sections and are arranged in such a manner that the planet wheel axle runs in a twisted manner to the pinion cage axis if the axial sections are received in the support sections, and
      a first projection connected to the base body for fixing the first axial section in the base body,
      a spiral gear planet wheel which is supported in the pinion cage in such a manner that it can rotate about a planet wheel axle and comprises a planet wheel toothing, wherein the planet wheel axle runs twisted relative to the pinion cage axis,
      a spiral gear shaft which is supported in such a manner that it can rotate about the pinion cage axis, and comprises a spiral gear toothing which is engaged with the planet wheel toothing, and
      an inner spiral gear with an inner toothing which engages with the planet wheel toothing,
   wherein the electromotor comprises a motor shaft which is connected in a rotation-proof manner to the spiral gear shaft.

16. The engine transmission arrangement according to claim 15, wherein the inner spiral gear is connected in a rotation-proof manner to the electromotor.

* * * * *